United States Patent [19]
Landau

[11] Patent Number: 5,902,694
[45] Date of Patent: May 11, 1999

[54] WATER TOP-UP PLUG FOR BATTERIES CONTAINING A LIQUID ELECTROLYTE

[76] Inventor: Reinhard Landau, Zerresweg 5, Viersen, Germany, 41749

[21] Appl. No.: 08/969,998

[22] Filed: Nov. 13, 1997

[30] Foreign Application Priority Data

Nov. 14, 1996 [DE] Germany .......................... 196 47 151

[51] Int. Cl.[6] ..................................................... H01M 2/36
[52] U.S. Cl. ............................... 429/64; 429/76; 429/79; 137/260; 141/198
[58] Field of Search .................................. 429/72, 64, 80, 429/76, 82, 79, 83, 89; 137/260, 409, 429, 430; 141/204, 205, 198

[56] References Cited

U.S. PATENT DOCUMENTS

| | | | |
|---|---|---|---|
| 4,386,141 | 5/1983 | Weidner et al. | 429/64 |
| 4,696,874 | 9/1987 | Tadiello | 429/64 |
| 4,749,633 | 6/1988 | Elias | 429/76 X |
| 4,751,156 | 6/1988 | Olimpio | 429/64 |
| 5,309,937 | 5/1994 | Rover | 429/76 X |

FOREIGN PATENT DOCUMENTS

| | | |
|---|---|---|
| 0207346A2 | 1/1987 | European Pat. Off. . |
| 0234278A1 | 9/1987 | European Pat. Off. . |
| 2708531 | 10/1980 | Germany . |
| 2822927 C2 | 6/1986 | Germany . |
| 3725976A1 | 2/1989 | Germany . |
| 4014103 A1 | 11/1991 | Germany . |
| 9405730 U | 7/1994 | Germany . |
| 19511803 A1 | 10/1996 | Germany . |
| 64000644 | 1/1989 | Japan . |
| WO 91/17577 | 11/1991 | WIPO . |

OTHER PUBLICATIONS

Patent Abstracts of Japan, vol. 013, No. 166 (E–746), Apr. 20, 1989 & JP 64 000644 A (Shin Kobe Electric Mach Co. Ltd.), Jan. 5, 1989, Abstract.

*Primary Examiner*—Anthony Skapars
*Attorney, Agent, or Firm*—Townsend and Townsend and Crew LLP

[57] ABSTRACT

A water top-up plug for batteries containing a liquid electrolyte has a plug housing, which is formed outwardly in the lower region so that it is complementary to an upper battery housing opening. A cover is arranged at the plug housing at the top, beneath which there is located a water chamber which has a water supply opening which can be closed by a valve and at least one flow connection to that region of the plug housing which, after the insertion into a battery housing opening, communicates with the inner space of the battery. Moreover, at least one tube stub is provided, onto which a water supply hose can be mounted and which stands in flow communication with the water inlet. At the bottom, a float projects out of the plug housing and is connected with the valve body via a float rod and a cross-piece provided at its upper end. The valve seat and the water supply opening are integrated in accordance with the invention into the plug housing.

33 Claims, 5 Drawing Sheets

WATER TOP-UP PLUG FOR BATTERIES CONTAINING A LIQUID ELECTROLYTE

FIELD OF THE INVENTION

The invention relates to a water top-up plug for batteries containing a liquid electrolyte.

DESCRIPTION OF PRIOR ART

In a prior known water top-up plug of the above-named kind (DE 29 51 194 U, EP 96 109 776 A1), the valve seat is provided on a cover-like component separate from the plug housing. The component is inserted in plug-like manner into a valve housing which is open at the top and is held by being a tight fit. The disadvantage of this known arrangement is that the valve seat component can be released from the plug housing, for example on freezing of water present in the valve housing and the associated expansion processes, whereby the efficacy of the valve is at least largely lost and the acid present in the battery can overflow. Moreover, the manufacture of the known water top-up plug is complicated and indeed in particular because of the requirement to manufacture the valve seat component in a separate working step. The manufacture of the valve seat component is also complicated because of the many slits distributed over the circumference.

SUMMARY OF THE INVENTION

The object of the present invention is to provide a water top-up plug of the initially named kind in which an undesired release of the valve seat from the plug housing is precluded, and which, as a result of a smaller number of components, can be manufactured and installed more simply and more economically. In particular the operational reliability of the water top-up plug is to be increased.

In order to satisfy this object there is provided a water top-up plug which is characterized in that the valve seat and the water supply opening are formed on or in one part of the plug housing, i.e. form an integrating component of the plug housing.

Thus, in accordance with the invention, the valve seat component forms an integral part of the plug housing itself, so that even with vibrations and/or frost a separation of the valve seat component from the plug housing is precluded. Apart from the enhanced operational reliability a substantial constructional advantage is also achieved in that a valve seat component which has to be manufactured separately and then assembled with the plug housing is avoided in that the valve seat component is integrated into the plug housing.

In accordance with a specific embodiment a valve chamber which also contains the valve seat as an integral part is formed within the plug housing. Only the valve body with the valve stem, which is preferably provided on it, has to be manufactured as a separate component, now as previously, but is however installable by simply introducing it into the valve chamber from the outside.

In accordance with another embodiment, on using a valve stem, the throughbore for the valve stem is also provided in the plug housing, with the space around the valve stem preferably being formed as a water supply passage.

In accordance with another embodiment of the invention, the valve seat and through-bore for the valve stem are expediently located above the valve chamber, which is initially open during manufacture, so that the valve body with the valve stem, and preferably also an O-ring for sealing, can be introduced from there without problem.

Thereafter, a closure of the valve chamber containing the valve body takes place through the ring flange of the abutment.

A diagnosis opening is preferably also integrated into the plug housing. A common cover is expediently used both for the water chamber and also for the diagnosis opening.

In accordance with a further particularly advantageous embodiment, the tube stubs serving for water supply or water throughflow need not be manufactured as a separate component and subsequently assembled to the plug housing. On the contrary, the tube stubs are also formed in one piece in one working step during the manufacture of the plug housing.

It is particularly advantageous when special water throughflow chambers are provided for the flow of water from the water chamber to the battery cell, so that the receiving bore for the float stem can be designed from the point of view of a good vertical guidance for the float.

The vertical connection channel, the bore and the valve chamber with the axial grooves form a siphon-like closure for the interior of the battery cell, onto which the top-up plug of the invention is mounted, with water always being present in the relevant region. This prevents the escape of gases from the battery cell to the outside into the pipe stubs, and into the water supply hoses connected thereto.

In accordance with another embodiment, the valve body is to be surrounded on all sides by parts of the plug housing only, without other components being present between the valve body and the surrounding parts of the plug housing, with the exception of parts of the abutment spigot.

The provision of a special O-ring receiving recess is particularly advantageous, because in this way a particularly reliable mounting of the O-ring is ensured because this receiving recess is formed precisely complementary to the shape of the O-ring.

The axial ribs should be dimensioned, in order not to hinder the introduction of the O-ring into the associated recess during the installation.

Another embodiment provides that the gases which emerge from the interior of the battery can escape. The gas conducting passage is restricted in cross section and/or extended downwardly in this arrangement in accordance with this invention so that splashes which occur during hefty movements do not reach the gas outlet opening as far as possible. The cover is preferably surrounded by a downwardly projecting cover flange. The gas outlet opening is expediently covered over by the cover flange so that the air exchange with the environment is not hindered.

DESCRIPTION OF PREFERRED EMBODIMENTS

In accordance with FIGS. 1, 2, 6 and 7, a substantially pot-like plug housing 11 has a plurality of retaining lips 40 at the bottom and distributed radially outwardly over the circumference and above them three concentric sealing rings 41, by means of which the plug housing 11, when pushed into a non-illustrated battery housing opening, can be mounted sealingly and vertically fixed in this opening. In the central region the plug housing 11 is provided with a flat cover plate 64 arranged transverse to its central axis 65, with the cover plate 64 being surrounded by a ring flange 42 which ensures that the plug housing 11 can only be inserted into the associated opening until the ring flange 42 strikes a counter-surface of the non-illustrated battery housing. As a result of the downwardly open axial slots 61, the lower end region of the plug housing 11 can deflect resiliently radially inwardly on insertion into a battery opening, whereby the retaining lips 40 can snap into a complementary circumferential groove provided in the battery housing radially outwardly of the opening, whereby the water top-up plug is reliably held at the battery housing.

Figure 5:
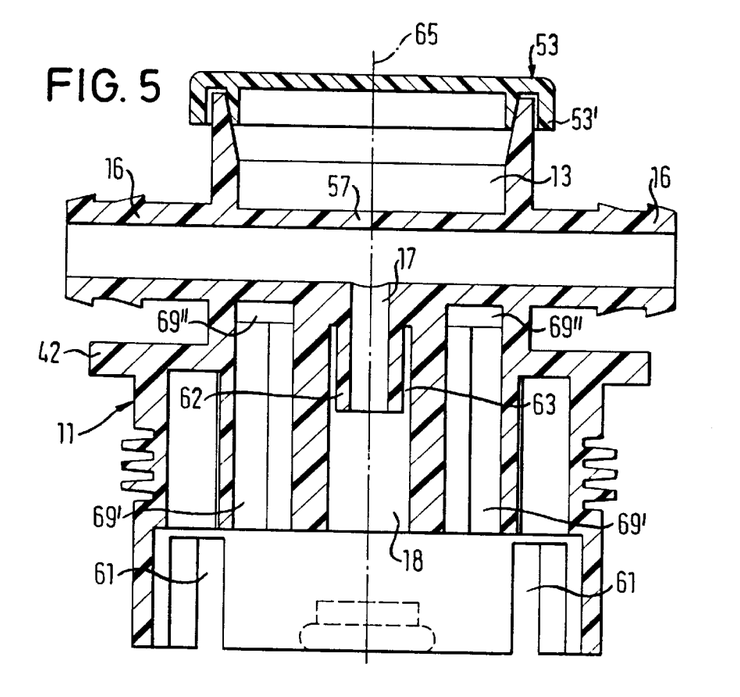
FIG. 5 is a schematic sectional view in accordance with the line V—V in FIG. 3.
Figure 6:
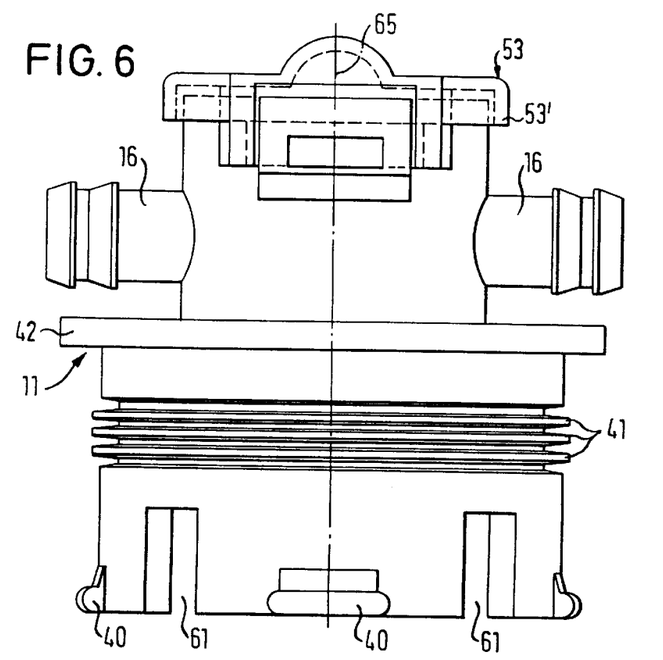
FIG. 6 is a side view of the water top-up plug of the invention in the direction of the arrow VI in FIG. 1.

Whereas the connection region 60 of the plug housing 11 located beneath the cover plate 64 is inserted into the non-illustrated battery housing opening and produces the connection to the latter, the region of the plug housing 11 above the cover plate 64 projects upwardly. In this region tube stubs 16 open into the plug housing 11 at the side, as seen in FIGS. 5, 6 and 8. The tube stubs 16 are formed in one piece with the plug housing 11, or are aligned with one another, and merge into a throughflow channel 57 (FIG. 5) which connects them and which is likewise integrated into the plug housing 11. The throughflow channel 57 is radialy offset in accordance with FIGS. 1, 2, 7 and 8 relative to the central axis 65 of the plug housing 11, which is of right cylindrical shapes at least in the lower region. The pipe stubs 16 also extend perpendicular to the central axis 65.

The connection region 60 can also be formed for mounting in a non-illustrated adapter, which can then in turn be sealingly introduced into the battery opening.

Figure 1:
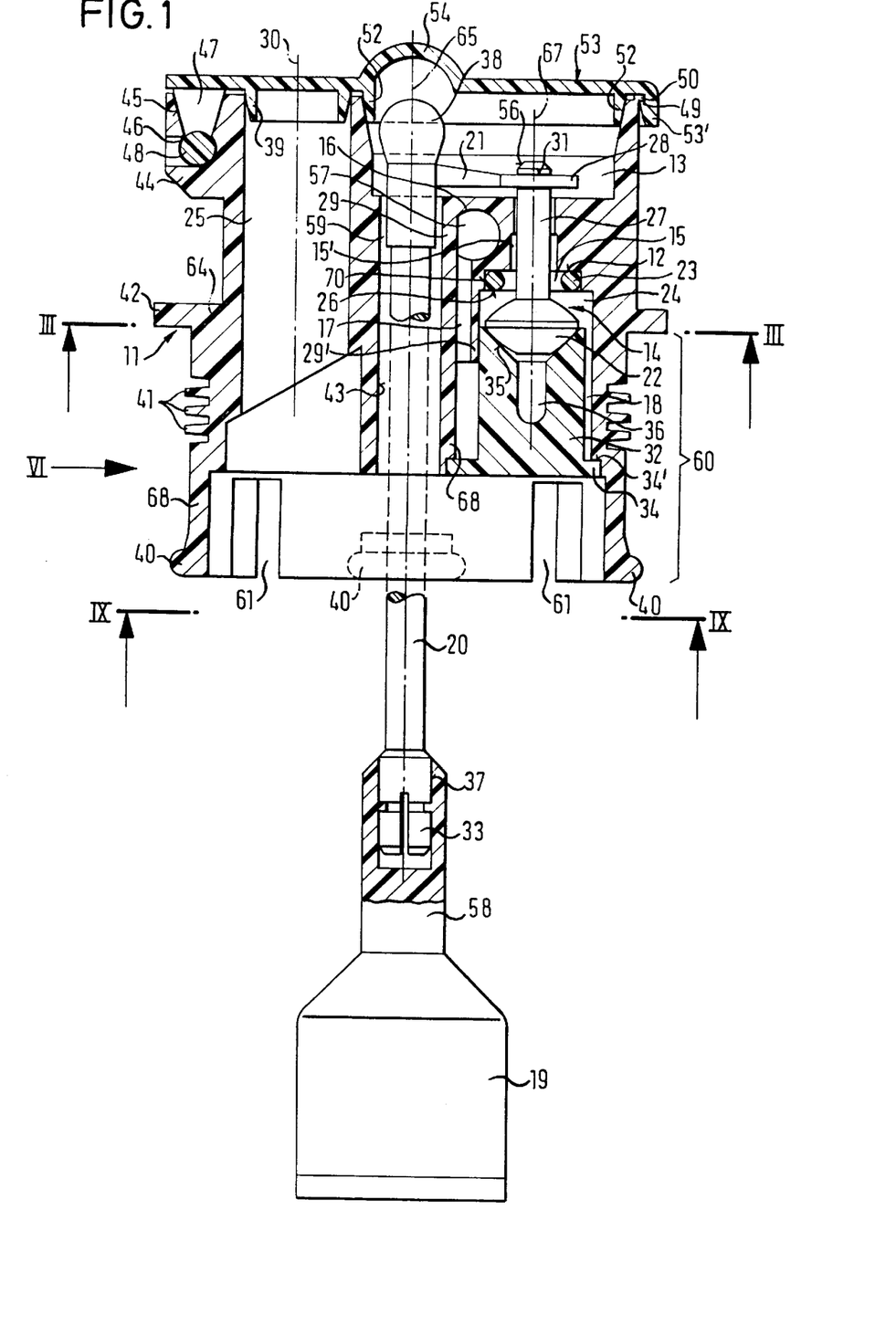
FIG. 1 is a partly vertically sectioned side view of a water top-up plug in accordance with the invention with the valve open.
Figure 2:
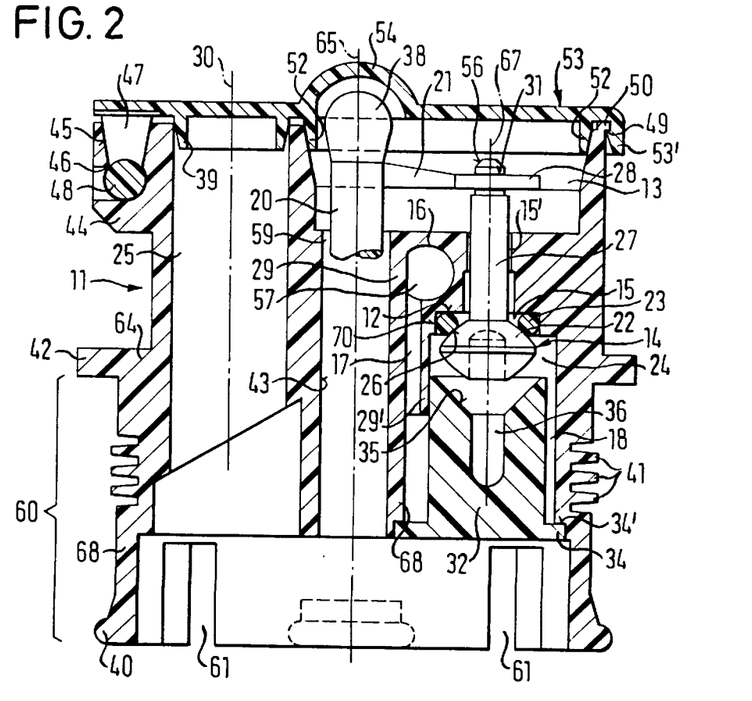
FIG. 2 is an analogous sectional view, with the float and float rod omitted, in the closed state of the valve.

In accordance with FIGS. 1, 2 and 5 a connection passage 17, which produces a flow connection, branches off downwardly from the throughflow passage 57 at the middle. The connection passage is provided, in accordance with FIGS. 1, 2, 3 and 5, in a material projection 29' at the edge of a downwardly open bore 18, having a substantially larger diameter. The bore 18 is provided with an eccentric axis 67 parallel to the central axis 65 and opens at a clear spacing from the lower end of the bore 17. The bore 18 merges at the top into a valve chamber 24 surrounded by axial ribs 62 described further below and represents a water inlet for the valve chamber. The bore 18 and the valve chamber 24 are eccentrically arranged relative to the central axis 65 and are of substantially right cylindrical shape with respect to the eccentric axis 67 extending parallel to the central axis 65. An abutment spigot 32 is inserted from below into the bore 18 and has a diameter smaller than the bore 18, such that a water receiving throughflow space is present around the abutment spigot 32. At the bottom, the abutment spigot 32 has a ring flange 34, which is inserted into a recess 34' matched thereto, and which sealingly closes the bore 18 from the bottom. The ring flange 34 is, for example, firmly and sealingly connected to the surrounding housing parts 68 by ultrasonic welding.

Figure 3:
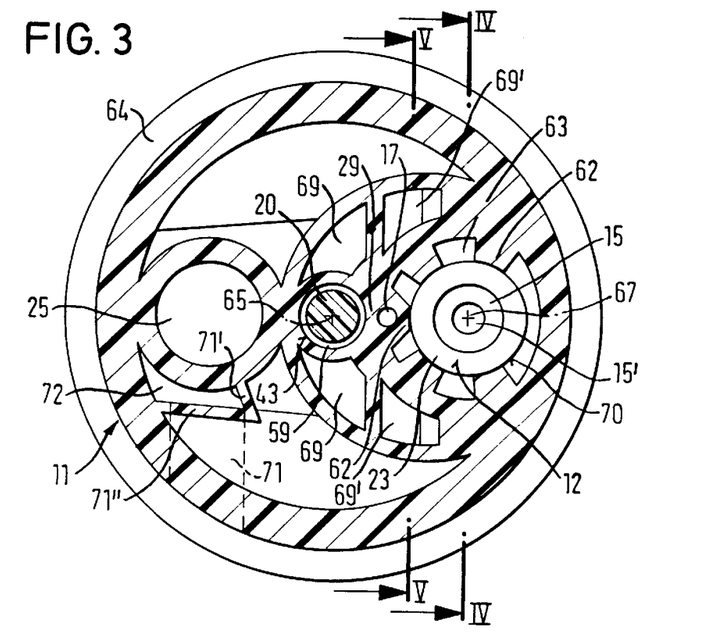
FIG. 3 is a schematic sectional view in accordance with the line III—III in FIG. 1.

In accordance with the FIGS. 1 to 3, the valve chamber 24 merges at the top via a radially inwardly projecting ring step 12, which surrounds a water supply opening 15 into a vertical bore 15' of reduced diameter, in which the valve stem 27 of a valve body 22 arranged in the valve chamber 24 is vertically displaceable and arranged with clearance on all sides An O-ring 23 lies on the ring step 12 and forms, together with the ring step 12, a valve seat 26 for the valve body 22. The O-ring has a radial spacing from the valve stem 27 such that the water supply opening 15 is present therebetween. The ring step 12 is preferably formed at an O-ring receiving recess 70, which has a substantially smaller diameter than the valve chamber 24 so that a step-like transition into the O-ring receiving recess 70 is also present when starting from the valve chamber.

In accordance with the invention, the O-ring receiving recess 70 is so dimensioned that it fittingly receives the O-ring 23 both in the radial direction and also in the axial direction.

The upper region of the valve stem 27 passes above the bore 15' at a vertical spacing from the latter through a guide cuff 15" (FIG. 4) into a water chamber 13 provided there. At the upper end, the valve stem 27 is connected in the vertical direction in form-fitted manner, apart from tolerances caused by manufacture, to a cross-piece 21 which extends radially up to and beyond a central vertical receiving bore 43. A float rod 20 extends from the radially inner end of the cross-piece 21, with clearance 59 on all sides relative to the inner wall of the receiving bore 43, downwardly and clearly beyond the lower margin of the plug housing 11 into the non-illustrated battery housing. As a result of the clearance 59 between the float rod 20 and the wall of the receiving bore 43, a flow connection exists between the water chamber 13 present above the bore 15' and the lower end of the plug housing 11. It is, however, more advantageous when, in accordance with FIG. 3, one or more substantially vertically extending water throughflow chambers 69 are provided on both sides adjacent the receiving bore 43. The water throughflow chambers are in flow communication at the top with the water chamber 13, or with the upper ends of vertical passage sections 55 provided to the side of the valve stem 27, which are in flow connection with the water chamber 13 and are in flow communication at the bottom with the interior of the battery cell, onto which the water top-up plug is mounted. In addition, or alternatively, two lateral passage sections 55 can be provided above the bore 15', which are open at the top to the water chamber 13 and which are connected radially outwardly with further, substantially vertically extending water throughflow chambers 69'. Beneath the throughflow passage 57, the upper part of the water throughflow chamber 69' has an intermediate floor 69'" (FIG. 4), at which it merges via a throughflow opening 69" into the offset lower part. In accordance with the invention, the bases of the passage sections 55 and the upper entry openings of the water throughflow chambers 69' lie beneath the level of the upper edge of the throughflow passage 57, so that the water preferably flows therethrough.

At the lower end the float rod 20 is provided with a coupling piece 33, which engages into a recess 37 at the upper end of the rod-like extension 58 of the float 19. The length of the float rod 20 is selected such that, with the plug housing 11 inserted into a battery opening and with the correct electrolyte filling of the battery, the float 19 dips sufficiently far into the electrolyte that it floats and lifts the valve body 22 via the float rod 20, the cross-piece 21 and the valve stem 27 into the closed position illustrated in FIG. 2, in which the valve body sealingly contact the O-ring 23.

Figure 4:
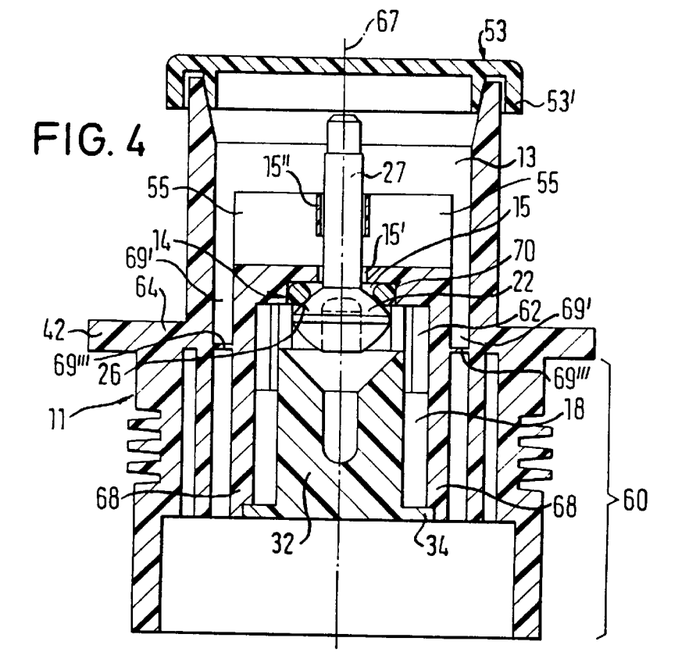
FIG. 4 is a schematic section in accordance with the line IV—IV in FIG. 3.

As can be particularly well seen from FIGS. 3 and 4, axial ribs 62 extend axially downwardly from the ring step 12 around the eccentric axis 67 and around the valve body 22, with axial grooves 63 being provided between the axial ribs, and indeed over a length such that an axial overlap takes place with the abutment spigot 32. The radial extent of the axial ribs 62 inwardly is just so large that they ensure the abutment spigot 32 lies on the eccentric axis 67, i.e. center it in this respect in a problem-free manner. The axial ribs 62 extend in the direction towards the bore 15' up to the start of the O-ring receiving recess 70, The axial ribs 62 terminate radially inwardly somewhat before the outer diameter of the O-ring receiving recess 70.

In the open state of the valve 14 (FIG. 1) formed by the valve body 22 and the valve seat 26, the ring space between the valve seat 26 and the valve body 22 forms a water supply opening 15, which is adjoined at the top by the vertical bore 15'. In analogous manner to the initially named prior art, the cross-piece 21 has a fork 28 with resilient prongs radially outwardly, which engage into a groove 31 at the upper end of the valve stem 27 in a form-fitted manner so that the valve body 22 follows the vertical movements of the float 19, with the exception of tolerances arising from manufacture. The valve body 22 with the valve stem 27 should thus not be able to move upwardly and downwardly independent of the float 19 and of the float rod 20.

As one can see from FIGS. 1 and 2, the valve stem 27 is provided at the top with an upwardly tapering chamfer 56, as a result of which the fork 28 of the cross-piece 21 can also be snapped from above onto-the upper end of the valve stems; 27. This is of importance because a lateral displacement of the two rods 20, 27 relative to one another is only possible to a restricted degree, despite the clearance present in the bores because of the axial guidance of the valve stem 27 in the bore 15 and of the float rod 20 in the receiving bore 43.

In accordance with FIGS. 1 to 3, the tbroughflow passage 57 and the connection passage 17 are sealingly separated by a wall piece 29 from a central receiving bore 43.

A diagnosis opening 25 with an eccentric axis 30 extending parallel to the central axis 65 is provided at the side of the plug housing 11 lying diametrically opposite to the valve chamber 24. The diagnosis opening 25 passes axially from the outside to the inside and acid samples can be taken from the battery through this opening to determine the state of charge. The bore 18 located directly beneath the valve chamber 24 containing the valve body 22 is open towards the bottom prior to assembly so that both the O-ring 23 and also the valve body 22 with the valve stem 27 can be inserted therefrom. Thereafter, the abutment spigot 32 is inserted into the bore 18 from the bottom until it has penetrated into the ring arrangement of the axial ribs 62 and the ring flange 34 is sealingly inserted into the recess 34' at the housing parts 68. Thereafter, the ring flange 34 is, for example, connected integrally with the plug housing 11, in the end position which can be seen from FIGS. 1 and 2, for example by ultrasonic welding.

At its upper end, the abutment spigot 32 is provided with a scat 35 which tapers downwardly in funnel-like manner, with the valve body 22 abutting against the seat 35 in the open position of the valve evident from FIG. 1.

At its lower end the funnel-like seat 35 merges into a blind bore 36 extending coaxially to the eccentric axis 67.

At the top the plug housing 11 is sealingly closed by a cover 53, which should consist, at least in its central region, of transparent material 30 that the level of the upper end 38 of the float rod 20 can be observed through an indicator dome 54 provided above the float rod 20.

The cover 53 sealingly closes off both the water chamber 13 and also the diagnosis opening 25 from the top, for which purpose hollow cylindrical projections 39, 52 are arranged downwardly at the cover 53 in such a way that they sealingly engage into the upper ends of the diagnosis opening 25 and of the right cylindrical water chamber 13. The cover 53 is provided with a cover rim 53' around it, which projects downwardly, other than in the region of the hinge 46, 47, 48.

Furthermore, an upwardly open, passage-like mounting 44 is molded onto the plug housing 11 at the top and radially outwardly. The insertion passage 45 of the Counting 44, which diverges upwardly in a V-like manner, is provided at the bottom with a latch recess 46, into which a latch pin 48 secured to the cover via intermediate elements 47 (see also FIG. 8) can snap releasably in order to form the hinge, as is shown in FIGS. 1 and 2. At the end lying diametrically opposite to the latch pin 48, the cover rim has an undercut 49, which engages behind one or preferably several radial latch projections 50 at the upper end of the plug housing 11. A lug 53" provided there and only indicated in FIG. 8 simplifies the opening and closing of the cover 53. Preferably two latch devices 49, 50 and lugs 53" are provided on both sides of the position shown in FIG. 8.

As already mentioned, the cover 53 has, above the right cylindrical water chamber 13-the central point 51 (FIG. 8) of which lies between the axes 65, 67-a hollow cylindrical projection 52 complementary thereto (FIGS. 1 and 2), with which the cover sealingly contacts the upper margin of the water chamber 13 in the snapped-on state in accordance with FIGS. 1 and 2.

In FIG. 8 the cover 53 with the latch projections 50, the sealing latch projection 52, the sealing ring projection 39 and also the intermediate elements 47 and the latch pin 48 extending between them are only indicated in broken lines in order to make the lower lying components visible, The manufacture of the water top-up plug of the invention proceeds as follows:

First of all, the plug housing 11, the cover 53, the valve body 22 with the valve stem 27, the cross-piece 21 with the float rod 20, the float 19 and the abutment spigot 32 are separately manufactured, for example by the plastic injection molding process. The water top-up plug in accordance with the invention is thus assembled from only five individual parts, to which must then be added the likewise pre-manufactured float 19 and the O-ring 23.

Thereafter, after the introduction of the O-ring 23 into the O-ring receiving recess 70, the valve body 22 with the valve stem 27 are introduced, with the abutment spigot 32 not yet inserted, from the bottom into the bore 18, with the valve stem 27 being guided through the vertical passage 15', until the upper end of the valve stem 27 with the groove 31 is located within the water chamber 13. The float rod 20 with the cross-piece 21 attached to it is then introduced from above into the receiving bore 43 and the fork 28 latches via the chamfer 56 into the groove 31 at the valve stem 27. Thereafter, the float 19 is snapped from below onto the lower end of the float rod 20 in accordance with FIG. 1.

Prior to this, the abutment spigot 32 is preferably inserted from below into the bore 18 up to and into the ring arrangement of axial ribs 62, preferably directly after the introduction of the valve body 22 into the valve chamber 24, whereupon the ring flange 34 is ultrasonically welded onto the housing parts 68 of the material of the plug housing 11.

Now it is only necessary for the cover 53 to be snapped from above onto the plug housing 11 in order to make the water top-up plug ready for operation.

It can subsequently be inserted directly or inserted via a suitable adapter into the battery opening, with the float 19 dipping to a greater or lesser degree into the liquid electrolyte located in the battery.

Thereafter, water supply and removal hoses are mounted onto the tube stubs 16 (FIGS. 5, 6, 8). Several water top-up plugs can be connected together via the tube stubs 16 and can be supplied from a single source of distilled water.

If distilled water flows through the tube stubs 16 and thus the through-flow passage 57 (FIG. 5), then this also enters through the connection passage 17 into the lower part of the ring space between the outer walls of the bore 18 and of the abutment spigot 32 (FIGS. 1, 2) and flows from there upwardly into the axial grooves 63 and the valve chamber 24 and then past the valve body 22 when the valve 14 is opened in accordance with FIG. 1. After passing through the valve 14, the distilled water flows via the water supply opening 15, the ring space present between the bore 15' and the valve stem 27, and also the two lateral passage sections 55 into the upper ends of the water throughflow chambers 69'. In addition, water rising above the throughflow passage 57 can also pass into the water throughflow chamber 69 and into the upper end of the receiving bore 43, The water then flows vertically through the water throughflow chamber 69, 69' or through the ring space 59 present between the float rod 20 and the wall of the receiving bore 43 downwardly into the battery housing. Accordingly, the liquid electrolyte in the battery housing is topped up with distilled water.

In this way the float 19 rises with the rising liquid level in the battery housing, and the valve body 22 is moved with it via the float rod 20, the cross-piece 21 and the valve stem 27 until it finally seats against the valve seat 26 (FIG. 2), whereby the flow connection between the throughflow passage 57 and the water chamber 13 is interrupted, and the further in-flow of distilled water into the relevant cell of the battery housing is suppressed. However, a water flow takes place through the tube stubs 16 and the throughflow passage 57 to the remaining water top-up plugs connected in series, where in each case the required quantity of liquid is individually and controllably extracted by the respective float 19. A certain amount of water always remains in the valve chamber 24 and in the supply lines which forms a gas seal.

The connection passage 17 and also the bore 18 with the valve chamber 24 above it and the axial grooves 63 form a siphon-like closure for gases, which arise in the battery cell closed by the water top-up plug.

Furthermore, a situation is achieved through the bore 18 which extends downwardly from the valve chamber 24, and through the connection passage 17 which opens into the bore 18 from the top, in which a water flow extending substantially from the bottom to the top is present in the valve chamber 24 and the axial grooves 63. It is important that the axial grooves 62 do not extend downwardly into the bore 18 so that the liquid supplied in the region of the bore 18 through the connection channel 17 can distribute uniformly around the abutment spigot 32.

In accordance with FIG. 8 the passage sections 55 extend from the upper end of the bore 15' in opposite directions to the side to the upper end of the vertical water throughflow chamber 69', which opens at the bottom into the space above the interior of the battery cell. As a result of this design, the water preferably flows through the passage sections 55 and the water throughflow chamber 69' into the battery cells. The further throughflow chambers 69 and the ring space 59 around the float rod 20 are, however, basically also available to lead the water to the battery cell.

Figure 7:
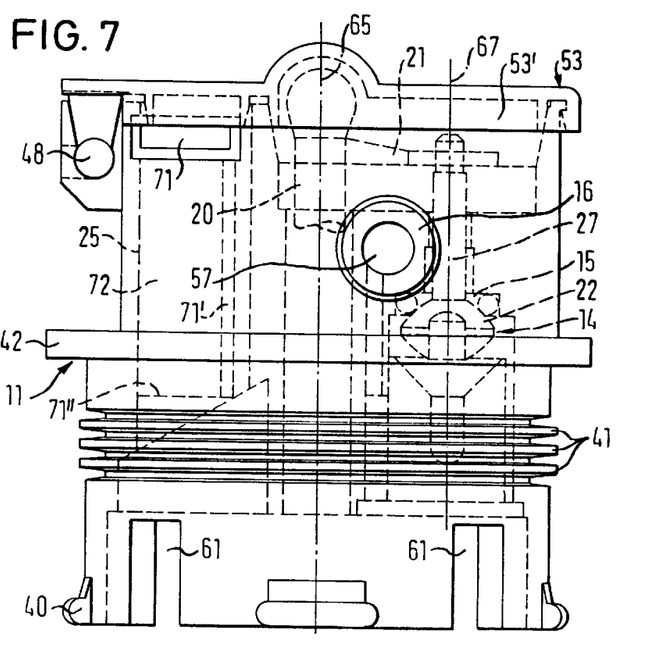
FIG. 7 is a side view of the same article from a direction turned through 90° around the central axis 65.
Figure 8:
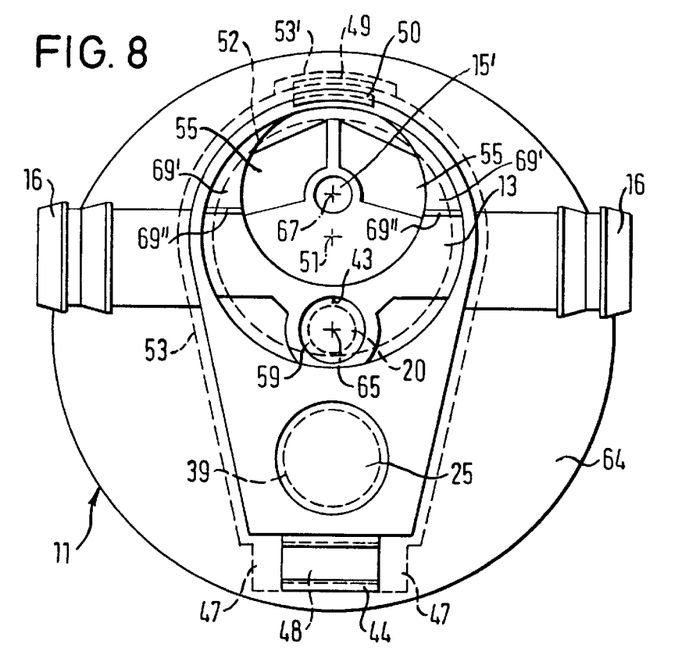
FIG. 8 is a plan view of the water top-up plug of the invention prior to installation of the valve body and of the cross-piece, with the cover and the float rod only being shown in broken lines.
Figure 9:
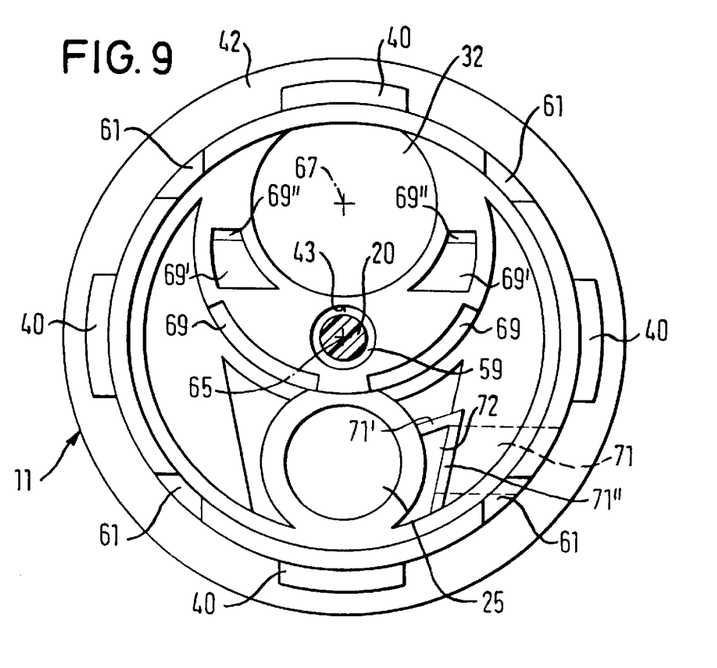
FIG. 9 is a partly sectioned view of the water top-up plug of the invention from the bottom in accordance with the line IX—IX in FIG. 1.

In accordance with FIGS. 7 and 9, a gas outlet opening 71 is provided in the upper part of the plug housing 11 at the side, and partly covered over by the cover rim 53'. The gas outlet opening 71 adjoins a vertical gas conducting passage 72 (FIG. 9) at the inside and communicates at the bottom with the interior of the battery. The gas conducting passage 72 is only restricted at the side, apart from the peripheral wall of the diagnosis opening 25 of the plug housing 11 by a passage wall 71' and a passage wall section 71", which expediently extends to the lower edge of the diagnosis opening 25. As the gas conducting passage 72 is separate from the water chamber 13, the degassing can take place independently of the water supply. The gas outlet opening 71 can also be provided at the top and/or at the bottom in a depression of the peripheral wall of the plug housing 11 in order to make it more difficult for spray to pass through to the outside.

Different float and float rod types can provided for one and the same water top-up plug and are expediently characterized by different colors and are each respectively suited for an individual type of battery.

The housing, which is inserted into an adapter, is formed beneath the cover plate 64 in such a manner that it fits into the adapter opening complementary thereto.

I claim:

1. Water top-up plug for batteries containing a liquid electrolyte, comprising:

a plug housing, which is formed at the outside in the lower region either complementary to an upper battery housing opening or complementary to an adapter, which is in turn designed complementary to an upper battery housing opening, an outwardly closed water chamber arranged at the top of the plug housing, the water chamber adjoining a water supply opening which is closeable by a valve including a valve body and a valve seat and having a water inlet having at least one flow connection with region of the plug housing, which, after insertion into a battery housing opening, is in flow communication with the inner space of the battery, at least one tube stub arranged at the plug housing and onto which a water supply hose is mountable, the tube stubs standing in flow communication with the water inlet, a float which extends through a receiving bore of the plug housing which projects out of the plug housing at the bottom and which is connected with the valve body via a float rod and a cross-piece provided at its upper end, wherein the valve seat and the water supply opening are formed on or in one part of the plug housing as an integrating component of the plug housing.

2. Water top-up plug in accordance with claim 1, further comprising a valve chamber which is bounded at one end by the valve seat and formed in the plug housing, with the valve body being arranged in the valve chamber for movement towards and away from the valve seat.

3. Water top-up plug in accordance with claim 1, further comprising a valve stem extending from the valve body through a bore in the plug housing to the cross-piece.

4. Water top-up plug in accordance with claim 3, wherein the bore has a larger diameter than the valve stem so that a ring space is provided around the valve stem and forms a water supply passage which adjoins the water supply opening.

5. Water top-up plug in accordance with claim 2, wherein the valve body is disc-like and surrounded by axial ribs extending in the direction of motion of the valve body with axial grooves located between the axial ribs.

6. Water top-up plug in accordance with claim 5, wherein the water inlet of the valve is formed as a bore arranged beneath the valve chamber, wherein the flow connection between the tube stubs and the bore opens into the bore, and wherein the bore is sealed at the bottom by an abutment pin inserted from the bottom having a smaller diameter than the bore.

7. Water top-up plug in accordance with claim 6, wherein the valve chamber is dimensioned so that the valve body is installed prior to the introduction of the abutment pin.

8. Water top-up plug in accordance with claim 7, wherein the abutment pin has a seat for the valve body which is located in the open position.

9. Water top-up plug in accordance with claim 2, wherein the valve chamber and the water inlet, which is concentric to the chamber, are eccentrically arranged in the circular plug housing, the water inlet being formed as a bore having a diameter which is smaller than the plug housing by more than half.

10. Water top-up plug in accordance with claim 1, wherein the plug housing includes a receiving bore for the float rod which is arranged at least substantially centrally and coaxially in the plug housing.

11. Water top-up plug in accordance with claim 9, wherein an axial diagnostic opening is provided passing from the outside to the inside of the plug and diametrically opposite to the valve chamber so that acid is extractable therethrough to determine the state of charge.

12. Water top-up plug in accordance with claim 11, wherein the diagnosis opening and the water chamber are sealed off from the outside by a common, removable lid.

13. Water top-up plug in accordance with claim 2, wherein the at least one tube stub is formed in one piece with the plug housing and extends perpendicular to a central axis of the plug housing.

14. Water top-up plug in accordance with claim 13, wherein one or two oppositely directed tube stubs are radially provided between the valve chamber and the receiving bore for the float rod as well as axially above the valve chamber.

15. Water top-up plug in accordance with claim 14, wherein the pipe stubs merge into a throughflow passage aligned there with and provided in the plug housing, from which a connection passage branches off, the connection passage being provided in a lateral material projection at the edge of the water inlet and extending downwardly.

16. Water top-up plug in accordance with claim 11, wherein the plug housing has a cover plate above a right cylindrical connection region, on which the housing parts of the valve chamber, the valve rod receiving bore and the diagnosis opening are provided in one piece and extend upwardly and downwardly.

17. Water top-up plug in accordance with claim 1, further comprising one or more water throughflow chambers outside of the receiving bore for the float rod and standing in flow communication at the top with the water chamber and at the bottom with a region of the plug housing which adjoins the inner space of a battery cell closed by the water top-up plug.

18. Water top-up plug in accordance with claim 5, wherein side walls of the valve chamber form an integrating component of the plug housing, and the axial ribs likewise form an integrating component of the plug housing.

19. Water top-up plug in accordance with claim 5, wherein the axial ribs extend axially up to the level of the valve seat.

20. Water top-up plug in accordance with claim 2, further comprising a valve stem extending from the valve body through a bore in the plug housing to the cross-piece and an O-ring receiving recess with a smaller diameter than the valve chamber and a larger diameter than the valve stem bore, the recess being disposed axially between the valve chamber and the valve stem bore.

21. Water top-up plug in accordance with claim 20, wherein the valve body is surrounded by axial ribs extending radially inwardly until shortly before or at most up to the radially outer edge of the O-ring receiving recess.

22. Water top-up plug in accordance with claim 16, wherein at least one gas outlet opening is provided in the region of the side wall of the plug housing lying above the cover plate and stands in communication with a lower hollow space of the plug housing leading to the interior of the battery, the plug further comprising a cover having a downwardly directed cover rim which at least partly covers over the at least one gas outlet opening.

23. Water top-up plug in accordance with claim 22, wherein the at least one gas outlet opening inwardly adjoins a vertical gas conducting channel which produces the connection to the lower hollow space, further comprising a vertical channel wall narrowing down the gas conducting channel to at least substantially the size of the at least one gas outlet opening and extending downwardly up to and into the hollow space, and up to the lower edge of the diagnosis opening.

24. Water top-up plug in accordance with claim 1 wherein the water chamber has a right cylindrical shape and a removable cover disposed at a top.

25. Water top-up plug in accordance with claim 1 wherein the receiving bore is located centrally in the plug housing.

26. Water top-up plug in accordance with claim 2 wherein the valve chamber is bounded at a top and the valve body is guidedly arranged to move relative to the valve seat.

27. Water top-up plug in accordance with claim 3 further comprising a valve chamber bounded at a top by the valve seat and formed in the plug housing, the valve stem bore adjoining the valve chamber at the top.

28. Water top-up plug in accordance with claim 4 further comprising at least one passage section arranged around or above the valve stem bore, the at least one passage section being open towards the water chamber.

29. Water top-up plug in accordance with claim 5 wherein the axial ribs directly adjoin the plug housing radially outwardly thereto.

30. Water top-up plug in accordance with claim 6 wherein the bore is disposed beneath the axial ribs.

31. Water top-up plug in accordance with claim 20 wherein the valve body is installed with an O-ring disposed in the O-ring receiving recess.

32. Water top-up plug in accordance with claim 15 wherein the water inlet is formed as a bore sealed at the bottom by an abutment pin inserted from the bottom having a smaller diameter than the bore, and the connection passage extends into a ring space defined between the outer walls of the bore and the abutment pin such that water flowing through the connection channel into the ring space passes upwardly into the valve chamber.

33. Water top-up plug in accordance with claim 17 further comprising a valve stem extending from the valve body through a bore in the plug housing to the cross-piece, and at least one passage section standing inwardly in connection with the valve stem bore and merging at a side into the at least one water throughflow chamber, the at least one passage section having a lower end standing in flow communication with the associated battery cell, the at least one water throughflow chamber being divided into an upper part and a lower part which are connected together by an opening formed therebetween.

* * * * *